Patented Apr. 6, 1948

2,439,147

UNITED STATES PATENT OFFICE 2,439,147

PROCESS FOR THE MANUFACTURE OF COLLOIDAL SULPHUR

Fernand Frederic Schwartz, Santiago, Chile

No Drawing. Application October 4, 1944, Serial No. 557,230

3 Claims. (Cl. 252—313)

This invention has for its object the industrial preparation of colloidal sulphur at low cost and with simple devices.

Colloidal solutions of sulphur, though being infinitely more effective than emulsions and suspensions of sulphur, have not been found very applicable on account of their excessive cost and complications in their manufacture.

I have found that in a solution of ammonium polysulphide stabilized with a protecting colloid as, for example, a solution of ammoniacal casein and ammonium ricinoleate, the action of an aldehyde produces liberation of the sulphur in a colloidal state.

For this purpose I prepared the ammonium polysulphide compound by saturating ammonia with sulphuretted hydrogen gas and simultaneously agitating the solution with finely pulverized sulphur. Once the ammonium polysulphide has been obtained a solution of ammoniacal casein and ammonium ricinoleate is added thereto.

The polysulphide stabilized with this protecting colloid reacts with an aldehyde, which may be formaldehyde, and liberates the sulphur in a colloidal state, while the ammonia remains combined with the formaldehyde in the form of hexamethylenetetramine.

Sulphur so formed possesses all the characteristics of a colloid. It may be diluted with water ad infinitum and without forming precipitates. Diluted solutions are transparent and concentrated solutions are translucent and opalescent.

The chemical activity of this type of sulphur is so energetic that it possesses greater efficiency in its different practical applications and makes it possible to operate with very dilute solutions. Its employment is much more economical than that of powdered sulphur or sulphur in the form of suspensions or emulsions.

By way of example the following is a method of carrying out the process:

Concentrated ammonia is introduced into an absorption tower whose base is provided with a mixing device and sulphuretted hydrogen gas is injected for complete saturation. Ammonium hydrosulphide is agitated at the bottom of the tower together with finely pulverized sulphur. The ammonium polysulphide absorbs again sulphuretted hydrogen gas making it possible in turn to dissolve a greater quantity of sulphur. By this means an ammonium polysulphide compound with 40 to 60% of dissolved sulphur may be easily obtained.

In a double bottom mixer with steam circulation casein and ricinoleic acid are dissolved with water and ammonia. The proportions may be:

| | |
|---|---:|
| Casein | 100 |
| Ricinoleic acid | 20 |
| Water | 200 |
| Ammonia | 100 |

The solution is heated and agitated until complete homogeneity of the ingredients is obtained.

Four parts of polysulphide are mixed with two parts of the casein solution and 42° formaldehyde is added until the mixture has more free ammonia and all the smell of sulphuretted hydrogen disappears.

The proportions and figures mentioned in this specification are only given as an example of the method of carrying out the manufacture of colloidal sulphur. It will be understood that other proportions may give similar results. The use of casein and ricinoleic acid may also be substituted by some other protecting colloid such as, for example, ammonium alginate and oleic acid or others. Also formaldehyde may be replaced by other aldehydes of greater molecular weight such as acetaldehyde and the like.

I claim:

1. A process for the preparation of colloidal sulphur which comprises the decomposition of ammonium polysulphide by reacting the same with an aldehyde in the presence of ammonium caseinate plus ammonium ricinoleate, as protective colloid.

2. A process for the preparation of colloidal sulphur which comprises the decomposition of ammonium polysulphide by reacting the same with an aldehyde in the presence of ammonium alginate plus ammonium oleate, as protective colloid.

3. A process for the preparation of colloidal sulphur which comprises the decomposition of ammonium polysulphide by reacting the same with an aldehyde in the presence of a protective colloid selected from the group consisting of ammonium caseinate plus ammonium ricinoleate and ammonium alginate plus ammonium oleate.

FERNAND FREDERIC SCHWARTZ.

REFERENCES CITED

The following references are of record in the file of this patent:

UNITED STATES PATENTS

| Number | Name | Date |
|---|---|---|
| 1,429,522 | Mittasch | Sept. 19, 1922 |
| 1,559,984 | Piver | Nov. 3, 1925 |
| 1,934,626 | Nagelvoort | Nov. 7, 1933 |
| 2,028,482 | Tucker | Jan. 21, 1936 |
| 2,047,492 | Reissman et al. | July 14, 1936 |
| 2,060,311 | Hashimoto | Nov. 10, 1936 |

OTHER REFERENCES

"Journal of Chem. Education," vol. 6, no. 12 (1929); article by Curtman et al., pages 2203–2205.

Mellor: "Theoretical and Inorganic Chemistry," vol. 10 (1930), pages 156 and 157.